(12) United States Patent
Yamanaka et al.

(10) Patent No.: US 8,743,181 B2
(45) Date of Patent: Jun. 3, 2014

(54) IMAGE PICKUP APPARATUS

(75) Inventors: Kazuya Yamanaka, Hachioji (JP); Kengo Enomoto, Tachikawa (JP); Kazuaki Murayama, Hachioji (JP); Hisashi Goto, Suginami-ku (JP)

(73) Assignee: Olympus Corporation, Tokyo (JP)

( * ) Notice: Subject to any disclaimer, the term of this patent is extended or adjusted under 35 U.S.C. 154(b) by 357 days.

(21) Appl. No.: 13/341,403

(22) Filed: Dec. 30, 2011

(65) Prior Publication Data

US 2012/0224031 A1  Sep. 6, 2012

(30) Foreign Application Priority Data

Mar. 4, 2011  (JP) ................................. 2011-047740

(51) Int. Cl.
*H04N 13/02* (2006.01)
*H04N 13/00* (2006.01)

(52) U.S. Cl.
USPC .............................................. 348/46; 348/42

(58) Field of Classification Search
None
See application file for complete search history.

(56) References Cited

U.S. PATENT DOCUMENTS 8,390,675 B1 * 3/2013 Riederer ......................... 348/47

FOREIGN PATENT DOCUMENTS

| JP | 2008-035308 A | 2/2008 |
| JP | 2010-041381 A | 2/2010 |

* cited by examiner

*Primary Examiner* — Heather Jones
(74) *Attorney, Agent, or Firm* — Westerman, Hattori, Daniels & Adrian, LLP

(57) ABSTRACT

A first calculating section calculates an amount of camera-shake correction based on an amount of shaking of the image pickup apparatus which has been detected, when each of a first capturing and a second capturing is carried out. A second calculating section calculates at least an amount of optical tilt-displacement between the image pickup element and an object for the first capturing, which is necessary for the second capturing, and the second calculating section calculates one of an amount of shift by which some of the image pickup lenses and the interchangeable image pickup lenses are to be shifted in a predetermined direction, and an amount of change by which an angle of an image pickup surface of the image pickup element with respect to the optical axial direction is to be changed, while the first capturing and the second capturing are being carried out.

10 Claims, 14 Drawing Sheets

IMAGE PICKUP APPARATUS

CROSS-REFERENCE TO RELATED APPLICATION

The present application is based upon and claims the benefit of priority from the prior Japanese Patent Application No. 2011-47740 filed on Mar. 4, 2011; the entire contents of which are incorporated herein by reference.

BACKGROUND OF THE INVENTION

1. Field of the Invention

The present invention relates to an image pickup apparatus.

2. Description of the Related Art

As a method for acquiring a stereoscopic image, a method in which the acquisition of a stereoscopic image can be realized by a single eye has been proposed.

Moreover, in digital cameras (image pickup apparatuses) in recent years, carrying out correction of camera-shake by driving an image pickup element or by driving some of the plurality of lenses has been becoming popular.

As an image pickup apparatus which acquires a stereoscopic image by a single eye and also realizes correction of camera-shake, an electronic camera described in Japanese Patent Application Laid-open Publication No. 2010-41381 and an electronic camera described in Japanese Patent Application Laid-open Publication No. 2008-35308 have been proposed.

In the electronic camera described in Japanese Patent Application Laid-open Publication No. 2010-41381, an image pickup lens is shifted for picking up an image in 3D (three dimensionally) and an image-motion correcting lens is shifted for correcting image motion optically. Moreover, in the abovementioned electronic camera, a lens or an image pickup element is driven for correcting the camera-shake.

Moreover, as a camera in which, an image pickup element is driven, an electronic camera described in Japanese Patent Application Laid-open Publication No. 2008-35308 has been proposed. In the electronic camera proposed in Japanese Patent Application Laid-open Publication No. 2008-35308, an image pickup element is used in conjunction in a field-tilt capturing in which the image pickup element is tilted, and camera-shake correction in which the image pickup element is driven.

As a method in which images on both left side and right side are picked up by time division, it is desirable to eliminate an effect of hand shake for realizing even higher image quality.

For instance, in Japanese Patent Application Laid-open Publication No. 2010-41381, an electronic camera in which the hand-shake correction besides picking up a 3-dimensional image with time division by single eye is described, has been disclosed.

Moreover, in Japanese Patent Application Laid-open Publication No. 2008-35308, the hand-shake correction and the field-tilt capturing by the image pickup element have been disclosed.

SUMMARY OF THE INVENTION

An image pickup apparatus according to the present invention includes one of an image pickup lens and a mounting portion on which, an interchangeable image pickup lens is mounted, a synchronization-signal generator to which a trigger signal is input, and which outputs a first synchronization signal and a second synchronization signal based on one trigger signal, an image pickup element which carries out a first capturing based on the first synchronization signal and carries out a second capturing based on the second synchronization signal, a first calculating section which calculates an amount of camera-shake correction based on an amount of shaking of the image pickup apparatus which has been detected, when each of the first capturing and the second capturing is carried out, a second capturing section which calculates at least an amount of optical tilt-displacement between the image pickup element and an object for the first capturing, which is necessary for the second capturing.

The second calculating section, based on a calculation result of the first calculating section and a calculation result of the second calculating section, calculates one of an amount of shift by which some of the image pickup lenses and the interchangeable image pickup lenses are to be shifted in a direction perpendicular to an optical axial direction of the interchangeable image pickup lenses or the image pickup lenses, and an amount of change by which an angle of an image pickup surface of the image pickup element with respect to the optical axial direction is to be changed, while the first capturing and the second capturing are being carried out.

The image pickup apparatus further includes a driving-signal output section which outputs a driving signal which drives some of the interchangeable image pickup lenses or the image pickup lenses, or the image pickup element, based on a result of calculation by the second calculating section.

DETAILED DESCRIPTION OF THE INVENTION

Exemplary embodiments of an image pickup apparatus according to the present invention will be described below in detail by referring to the accompanying diagrams. However, the present invention is not restricted to the embodiments described below.

First Embodiment

In an image pickup apparatus according to a first embodiment, a movable lens 112 is a lens in an image pickup lens group 110. A motion blur is corrected by shifting the movable lens 112 in a direction perpendicular to an optical axis 110c of the image pickup lens group 110, and a first stereoscopic image and a second stereoscopic image are acquired.

Figure 1A:
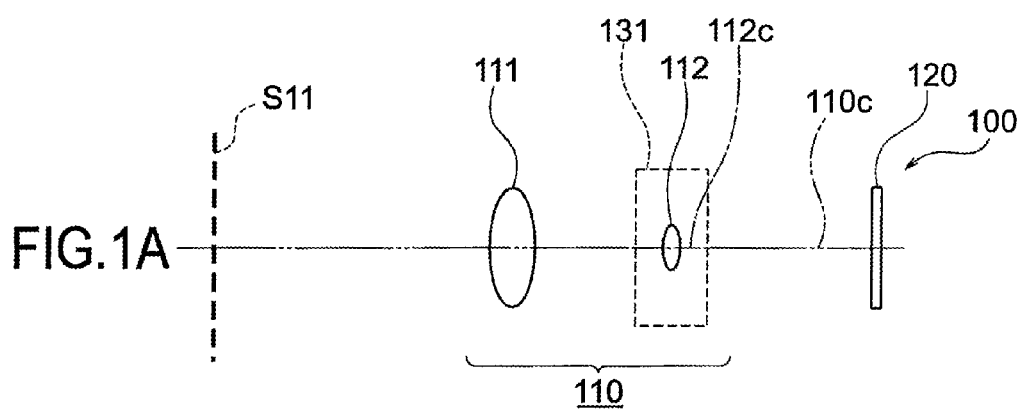
FIG. 1A, FIG. 1B, and FIG. 1C are diagrams showing a concept of an image pickup apparatus according to a first embodiment of the present invention.
Figure 1B:
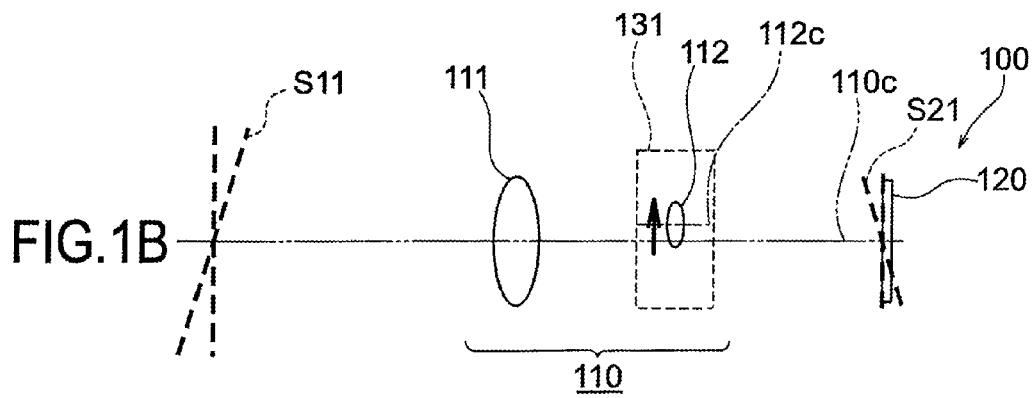
Figure 1C:
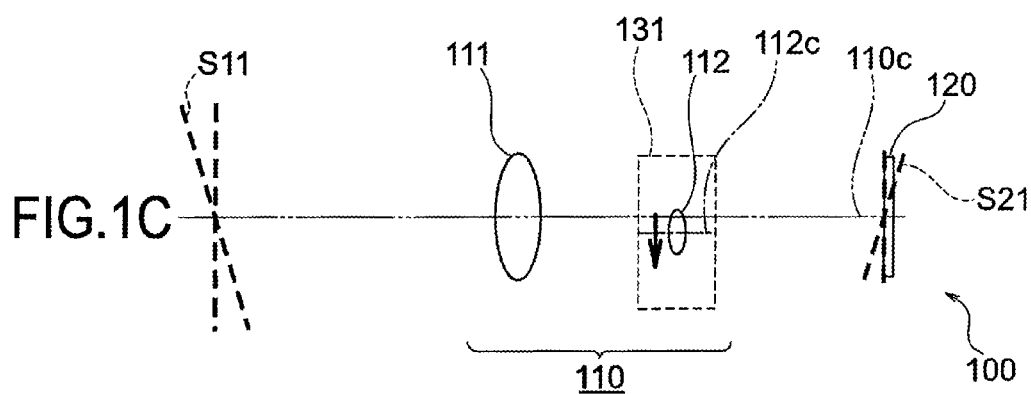
Figure 2:
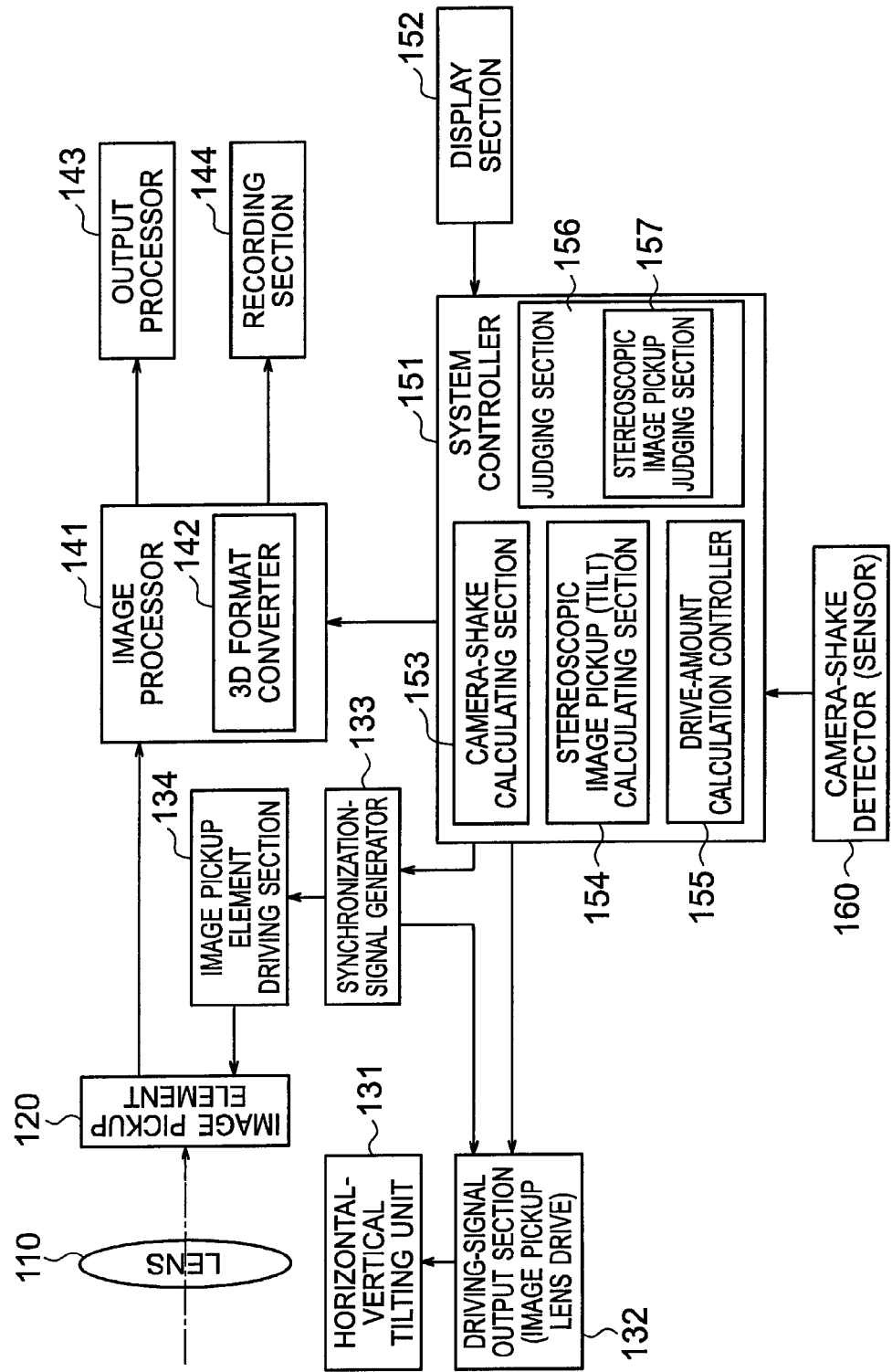
FIG. 2 is a block diagram showing a configuration of the image pickup apparatus according to the first embodiment of the present invention.

FIG. 1A, FIG. 1B, and FIG. 1C are top views showing a concept of a digital camera 100 as an image pickup apparatus according to the first embodiment. FIG. 2 is a block diagram showing a configuration of the digital camera 100 according to the first embodiment. The configuration of the digital camera 100 according to the first embodiment will be described below by referring to FIG. 1A, FIG. 1B, FIG. 1C, and FIG. 2.

In FIG. 1A, FIG. 1B, and FIG. 1C, a diaphragm and other members are not shown for the sake of convenience of description.

The digital camera 100 shown in FIG. 1A, FIG. 1B, and FIG. 1C includes the image pickup lens group 110, an image pickup element 120, a horizontal-vertical tilting unit 131, a driving-signal output section 132, a synchronization-signal generator 133, an image pickup element driving section 134, an image processor 141, an output processor 143, a recording section 144, a system controller 151, an instruction section 152, and a camera-shake detector 160.

The digital camera 100 shown in FIG. 2 is widely applicable to various equipments provided with a function of video display and video shooting, such as a digital camera, a digital video camera, a surveillance camera, and a mobile telephone with a photography function.

The image pickup lens group 110 is a photographic optical system for forming an optical object-image on an image pickup surface of the image pickup element 120. The image pickup lens group 110 includes a fix lens 111 and the movable lens 112 as a plurality of optical elements which are disposed in order from an object side as shown in FIG. 1A, FIG. 1B, and FIG. 1C.

The image pickup element 120 includes the image pickup surface on which a plurality of pixels is arranged in rows. The image pickup element 120 generates an electric image signal upon converting opto-electrically an optical object image which has been formed by the image pickup lens group 110. The image pickup element 120 is an image pickup element which is capable of carrying out successively pixel reading (electronic rear shutter curtain) and pixel resetting (electronic front shutter curtain) in a pixel unit or a line unit, at a desirable timing, or in other words an image pickup element in which an exposure time is variable. An X-Y address type image pickup element such as a CMOS image pickup element can be cited as a concrete example of the image pickup element 120. However, the image pickup element 120 is not restricted to only such image pickup element.

The synchronization-signal generator 133, under the control of the system controller 151, generates a vertical synchronization signal VD which becomes a basis of a timing at which the image pickup element 120 is driven.

The system controller 151, when there is a vertical synchronization period (vertical synchronization period corresponding to an image pickup frame rate) which is determined based on an input from the instruction section 152, outputs a trigger signal to the synchronization-signal generator 133, and also sets the vertical synchronization period in the synchronization-signal generator 133.

The system controller 151, when there is no vertical synchronization period which is determined based on the input from the instruction section 152, sets the vertical synchronization period which has been determined in advance, in the synchronization-signal generator 133. Examples of the vertical synchronization period are a vertical synchronization period corresponding to an image pickup frame rate which has been imparted as a standard value and a vertical synchronization period corresponding to an image frame rate which has been used currently for driving the image pickup element 120.

In such manner, the system controller 151 controls the synchronization-signal generator 133 to generate the vertical synchronization signal VD of the vertical synchronization period which has been set in the synchronization-signal generator 133.

The image pickup element driving section 134, under the control of the system controller 151, drives the image pickup element 120 upon generating a reading-start pulse and a shutter-start pulse with the vertical synchronization signal VD which has been generated by the synchronization-signal generator 133, as a basis for timing.

The driving-signal output section 132, under the control of the system controller 151, carries out control of shifting the movable lens 112 of the image pickup lens group 110, with the vertical synchronization signal VD which has been generated by the synchronization-signal generator 133, as a basis for timing. The system controller 151, conforming to a 3D mode which has been determined based on the input from the instruction section 152, selects a direction of shifting, an amount of shifting of the movable lens 112, and a photography pattern and carries out the control of lens shifting.

The horizontal-vertical tilting unit 131 shifts the movable lens 112 according to a control instruction of the driving-signal output section 132. The shifting can be carried out by using a voice coil motor (VCM), a stepping motor, and an ultrasonic motor.

The image processor 141 carries out various image processing of an image signal which has been picked up and read by the image pickup element 120, and includes a 3D format converter 142. As the instruction section 152 selects a 3D mode, the 3D format converter 142 is set to the 3D mode by the system controller 151. The 3D format converter 142 carries out 3D format conversion according to the mode which has been set. As 3D format conversion, SIDE BY SIDE, LINE BY LINE, ABOVE-BELOW, CHECKERBOARD are to be used.

The output processor 143 outputs an image (including an image subjected to the 3D format conversion) which has been processed for display by the image processor 141, to an external display unit such as a television. Furthermore, the output processor 141 also carries out an image output processing to a display device which displays a menu related to an operation of the digital camera.

The recording section 144 stores image data which has been processed by the image processor 141 for recording, as a nonvolatile memory, and is formed on an outer side of the digital camera as a removable memory such as a memory card which can be taken out. Consequently, the recording section 144 does not have to be in a form peculiar to the digital camera.

The display section 152 is a user interface for carrying out an operation input to the digital camera, and includes a power-supply button for putting a power supply ON and OFF, a capturing button for giving an instruction to start capturing, an image pickup mode setting button for setting a mode such as a 3D mode, and various other setting buttons.

The system controller 151 includes a camera-shake calculating section 153, a stereoscopic image pickup calculating section 154, a drive-amount calculation controller 155, and a judging section 156. The judging section 156 includes a stereoscopic image pickup judging section 157.

The camera-shake calculating section 153, as a first calculating section, calculates an amount of camera-shake correction based on a result of detection by the camera-shake detector 160. The stereoscopic image pickup calculating section 154 (tilt image pickup calculating section), as a second calculating section, calculates an amount of 3D displacement of each of a first tilt (first field tilt) and a second tilt (second field tilt). The drive-amount calculation controller 155 controls a shifting drive of the image pickup lens group 110 and the movable lens 112, based on a result of calculation of the amount of camera-shake correction by the camera-shake calculating section 153. The judging section 156 (stereoscopic-image pickup judging section) compares an absolute value of the amount of camera-shake correction calculated by the first calculation and an absolute value of the amount of 3D displacement (first tilt-displacement amount and second tilt-displacement amount) calculated by the second calculation. The stereoscopic image pickup judging section 157, upon superimposing information of checking whether there is image generation by the image processor 141, displays to the display device from an output processor, and confirms the presence or absence of generation of the image which has been picked up, to the user.

Here, the horizontal-vertical tilting unit 131, as shown in FIG. 1A, FIG. 1B, and FIG. 1C, is capable of shifting the lens 112 in a direction perpendicular to an optical axis 10*c* of the image pickup lens group 110. As the lens 112 is shifted, an optical axis 112*c* thereof shifts to a position parallel to the optical axis 110*c* of the image pickup lens group 110. By capturing once for carrying out the shifting operation in two directions, it is possible to acquire a pair of images having depth information and no parallax.

In a normal state shown in FIG. 1A, the optical axis 112*c* of the lens 112 is on the optical axis 110*c* of the image pickup lens group 110, and an object plane S11 and an image pickup surface of the image pickup element 120 are perpendicular to an optical axis 113*c*.

Whereas, as shown in FIG. 1B, when the lens 112 is shifted within a plane perpendicular to the optical axis 110*c* of the image pickup lens group 110, the object plane S11 is inclined such that a right-end side (an upper side of FIG. 1A, FIG. 1B, and FIG. 1C) of the object plane S11 comes closer to the image pickup lens group 110, and a left-end side (a lower side of FIG. 1A, FIG. 1B, and FIG. 1C) of the object plane S11 moves away from the image pickup lens group 110. At this time, an image plane S21 is inclined such that a right-end side of the image plane S21 comes closer to the image pickup lens group 110, and a left-end side of the image plane S21 moves away from the image pickup lens group 110. When the image plane S21 has inclined with respect to the image pickup element 120 in such manner, for a portion in focus with the image pickup element 120, it is possible to acquire an image for which, a position which is in focus in a direction of depth is different. Accordingly, it is possible to acquire a first image having information of depth.

Moreover, as shown in FIG. 1C, when the lens 112 is shifted in a plane perpendicular to the optical axis 110*c* of the image pickup lens group 110, and in a direction symmetrical in a case of FIG. 1B with respect to the optical axis 113*c*, the object plane S11 is inclined such that a left-end surface thereof comes closer to the image pickup lens group 110 and a right-end surface thereof moves away from the image pickup lens group 110. At this time, the image plane S21 is inclined such that a left-end side thereof comes closer to the image pickup lens group 110 and a right-end side thereof moves away from the image pickup lens group 110. When the image plane S21 has inclined in such manner, for a portion in focus with the image pickup element 120, it is possible to acquire an image for which, a position which is in focus in a direction of depth is different, and the image acquired is a second image.

The digital camera 100, as shown in FIG. 1B, acquires the first image which has been captured upon shifting the lens 112 such that the object plane S11 is inclined from an inner-left to a front-right, as a right-eye image, and as shown in FIG. 1C acquires the second image which has been captured upon shifting the lens 112 such that the object plane S11 is inclined from a front-left to an inner right, as a left-eye image. The digital camera 100 acquires a stereoscopic image from the pair of the images acquired.

In such manner, it is possible to acquire a tilted-image from observing points which are different for the first image and the second image. Consequently, by outputting the first image and the second image simultaneously at the time of outputting a projected image, as a pair of stereoscopic (3D) images, it is possible to output a stereoscopic image.

Figure 3:
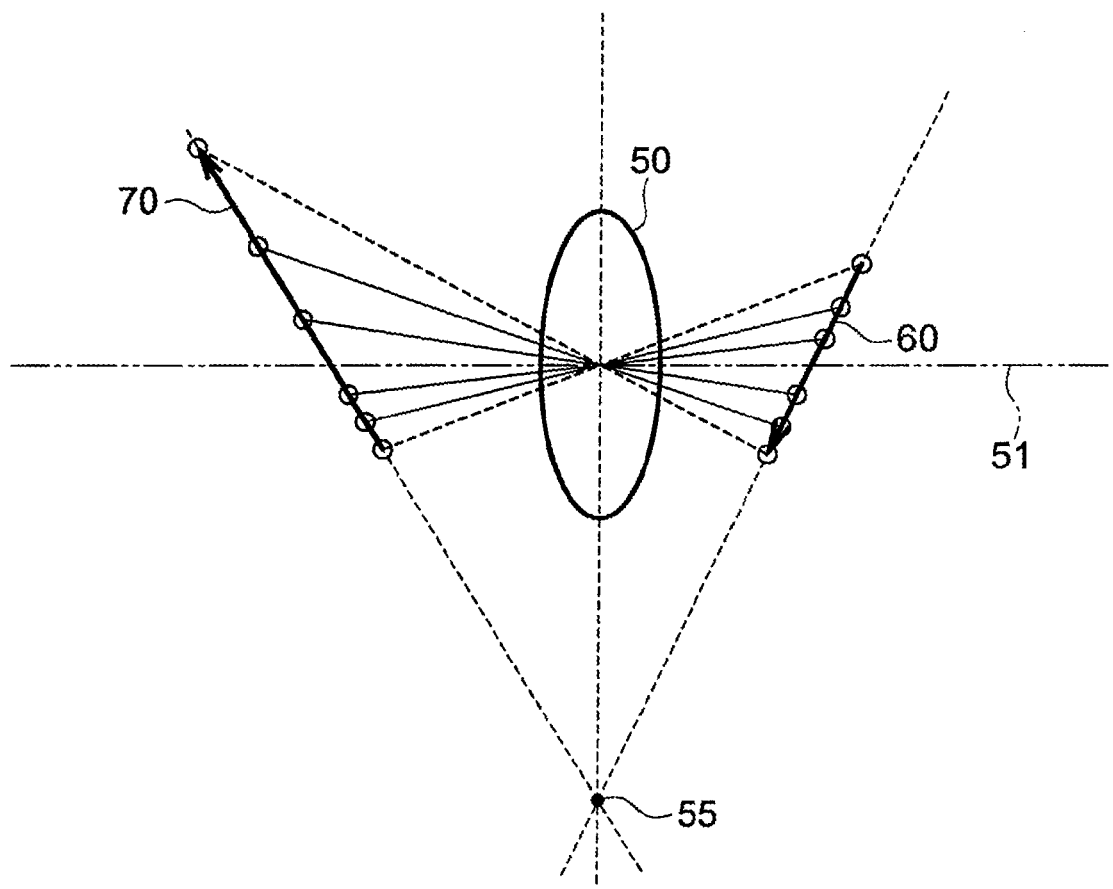
FIG. 3 is a conceptual diagram for explaining Scheimpflug principle.

The abovementioned inclination of the object plane S11 is based on Scheimpflug principle. FIG. 3 is a conceptual diagram for explaining Scheimpflug principle.

When the image pickup surface and a are disposed not to be in parallel, the object plane ceases to be parallel to the principal plane of the lens, and the image pickup surface, the principal plane, and the image plane intersect on the same single line (represented by intersection point 55 in FIG. 3).

Consequently, in a state of an image pickup surface 60 of an image pickup element perpendicular to an optical axis 51 of an image pickup lens 50, an object plane 70 also becomes perpendicular to the optical axis 51. Whereas, as shown in FIG. 3, when the image pickup surface 60 is inclined at an angle other than 90 degrees, the object plane 70 is inclined to be tilted to cope with the inclination of the image pickup plane 60 according to Scheimpflug principle. Moreover, if the angle of the image pickup surface 60 is changed, the magnification of the image plane in the height direction varies with respect to the optical axis 51.

By these phenomena, it is possible to acquire an image with a focusing position in a direction of inner depth irrespective of whether or not there is a parallax, and to generate a stereoscopic image.

Figure 4:
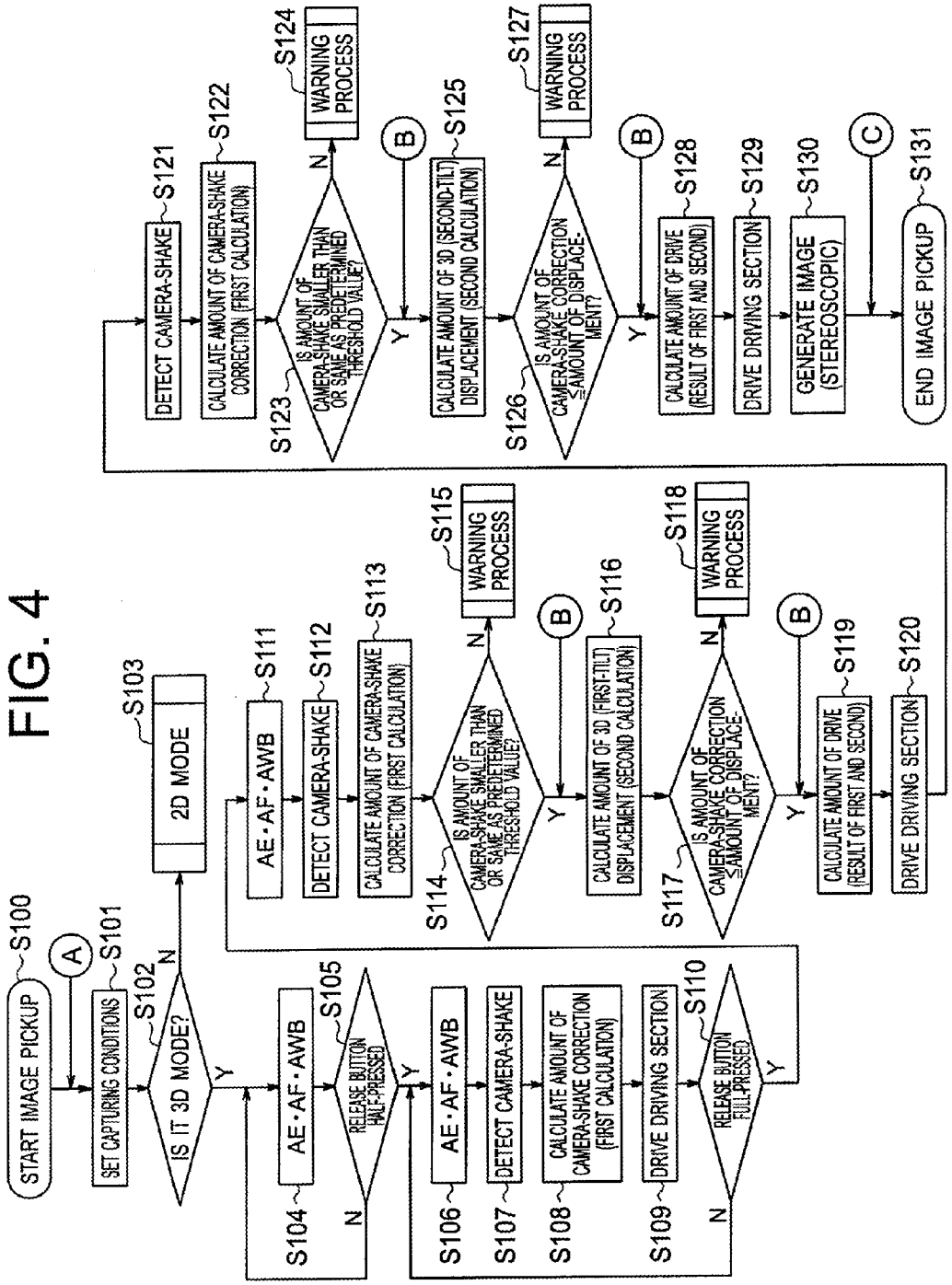
FIG. 4 is a flowchart showing a flow of an image pickup process of a still image using the image pickup apparatus according to the first embodiment of the present invention.

Next, a flow of image pickup in a case of a still image will be described below. FIG. 4 is a flowchart showing a flow of an image pickup process using the image pickup apparatus according to the first embodiment.

As a camera is started and a capturing mode (still image) is set upon operating of an instruction section 152 by a user, an image pickup starts (step S100).

The digital camera being similar to the existing digital camera, the description in detail will be omitted. Next, the user sets image pickup conditions according to a photographing environment and a mode of capturing (step S101). An aperture, shutter speed, ISO sensitivity, and focal length are some of the examples of image pickup conditions.

Next, the system controller 151 makes a judgment of whether or not the mode selected by the user at step S100 is a 3D mode (step S102). When the mode which has been selected is a 2D mode (2-dimensional) (N at step S102), there is no stereoscopic image pickup, and the image is picked up similarly as by the existing 2D camera (step S103).

Whereas, when the 3D mode has been selected (Y at step S102), there is a shift to a state in which stereoscopic image pickup from step S104 which will be described later, onward is possible.

AE (automatic exposure), AF (auto focus), and AWB (auto white balance) processes are carried out by the existing method, and a through-the-lens image display is carried out (step S104).

Here, description of camera functions AE, AF, and AWB, and other camera function will be omitted.

Next, the system controller 151 makes a judgment of whether or not a shutter-release button has been half-pressed (step S105). While the shutter-release button is not half-pressed (N at step S105), AE, AF, and AWB processes (step S104) are carried out repeatedly, and process results are updated successively. The shutter-release button corresponds to a shutter button 545 in a digital camera 540 shown in FIG. 13 and FIG. 14.

In a case in which, the shutter-release button is half-pressed (Y at step S105), the AE, AF, and AWB processes are carried out (step S106). These processes are carried out by the existing methods similarly as at step S104, and stored in a storage section 144.

Next, the camera-shake detector 160 carries out detection of camera shake by an instruction from the system controller (step S107).

The camera-shake detector 160 is a sensor which is capable of measuring shaking of an image pickup apparatus, such as an angular velocity of the image pickup apparatus. The camera-shake detector 160 detects an amount of tilting of an optical axis (amount of inclination of optical axis) and an amount of shift of an optical axis. Here, the amount of tilting of an optical axis is an angle, and a direction and the amount of shift of optical axis is an amount of movement and a direction.

Next, the camera-shake calculating section 153 calculates an amount of camera-shake correction as a camera-shake correction calculation (first calculation) based on a result of detection of camera-shake by the camera-shake detector 160 (step S108).

The drive-amount calculation controller 155, based on a result of calculation of the amount of camera-shake correction by the camera-shake calculating section 153, controls driving of the movable lens 112 of the image pickup lens group 110 (step S109). The movable lens 112 is driven by applying a driving signal corresponding to the amount of camera-shake correction of the result of calculation of camera-shake with respect to the horizontal-vertical tilting unit 131 from the driving-signal output section 132.

Figure 5:
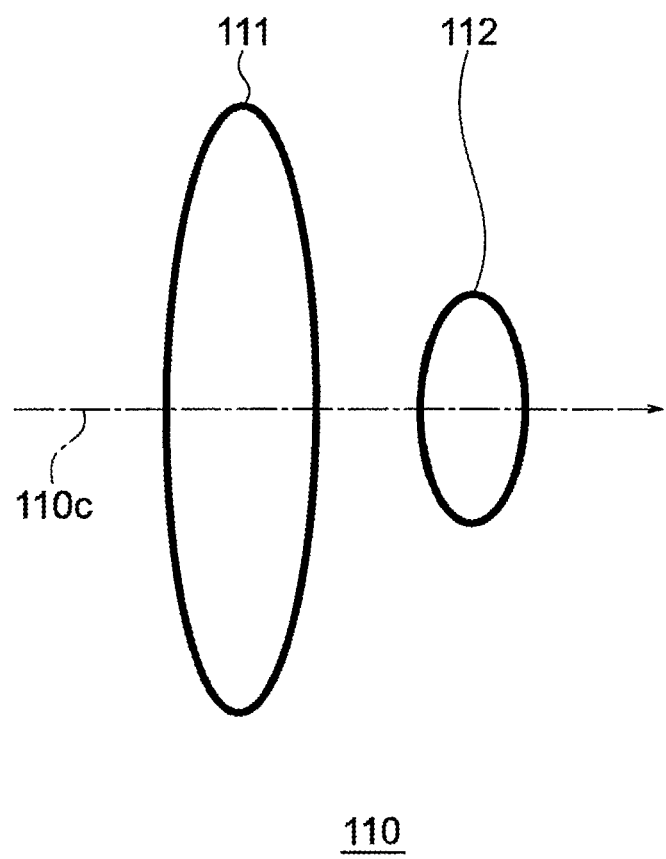
FIG. 5 is a cross-sectional view showing a configuration example of lenses in the first embodiment of the present invention, and is a diagram of a state in which the lenses are not shifted.
Figure 6:
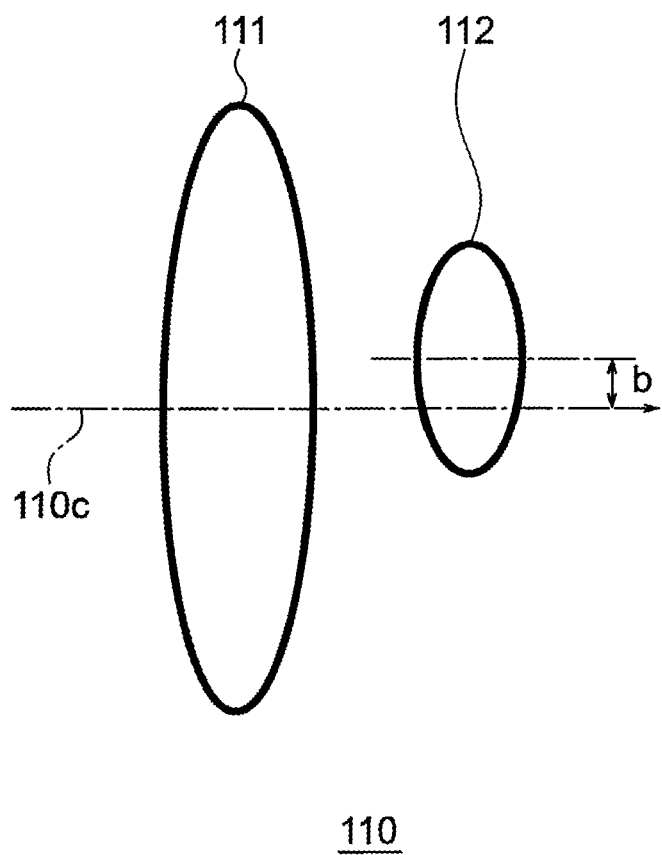
FIG. 6 is a cross-sectional view showing a state in which some of the lenses in the first embodiment of the present invention are shifted.

FIG. 5 is a cross-sectional view showing a configuration example of the image pickup lens group 110, and is a diagram of a state in which the image pickup lens group 110 has not been shifted. FIG. 6 is a cross-sectional view showing a state in which the movable lens 112 has been shifted in a direction perpendicular to the optical axis 110c of the image pickup lens group 110.

As shown in FIG. 5, the image pickup lens group 110 has a plurality of lenses such as the lens 112 and the lens 110, and has the optical axis 110c. At least one of the lenses in the image pickup lens group 110 is movable in a direction perpendicular to the optical axis 110c, and in an example shown in FIG. 5, the movable lens 112 can be shifted in the direction perpendicular to the optical axis 110 by the horizontal-vertical tilting unit 131. In an example sown in FIG. 6, the movable lens 112 is shifted only by an amount b of camera-shake correction in the direction perpendicular to the optical axis 110c.

In such manner, by driving the image pickup lens group 110 based on the amount of camera-shake correction which has been calculated, the camera-shake correction is carried out, and an image without effect of camera-shake is acquired. The camera-shake correction is repeated till the shutter-release button is fully pressed (till there is N at step S110).

Next, when the shutter-release button is fully pressed by the user (Y at step S110), the system control election 151 starts acquiring the first image (first capturing) of the stereoscopic image pickup (from step S111 onward). Here, a one-eye image for a time-divided stereoscopic image pickup, such as a left-eye image, is to be selected as the first image.

For acquiring the first image, firstly, the AN, AF, and AWB processes are to be carried out (step S111). These processes are similar to processes at step S104.

Next, the camera-shake detector 160 carries out detection of camera-shake according to an instruction from the system controller 151 (step S112) similarly as at step S107. Furthermore, the camera-shake calculating section 153 calculates the amount of camera-shake correction as the camera-shake correction amount calculation (first calculation) based on the result of detection of camera-shake by the camera-shake detector 160 (step S113) similarly as at step S108.

The judging section 156 of the system controller 151 makes a judgment of whether or not the amount of camera-shake correction or the amount of camera-shake calculated at step S113 is smaller than or same as a predetermined threshold value (step S114). The threshold value is an arbitrary value from 0 to a displacement-limit of the image pickup lens group 110, or a value determined by a threshold-value table in which an effect of camera-shake in accordance with the capturing conditions (step S101) has been taken into consideration.

When at step S114, the amount of camera-shake correction or the amount of camera-shake exceeds the threshold value (N at step S114), a warning process (FIG. 8) which will be described later is carried out (step S115).

Whereas, when at step S114, the amount of camera-shake correction or the amount of camera-shake is smaller than or same as the threshold value (Y at step S114), the stereoscopic image pickup calculating section 154 calculates an amount of 3D displacement as a first-tilt (second calculation, step S116). The stereoscopic image pickup calculating section 154, for acquiring a one-eye image for the time-divided stereoscopic image pickup such as a first tilt image for left eye, calculates an amount of displacement corresponding to a driving signal to be imparted to the horizontal-vertical tilting unit 131.

Here, in a time-division element tilting stereoscopic image pickup, it is possible to fix the amount of 3D displacement to a value corresponding to the amount of tilting. The amount of 3D displacement can be set according to the mode of a driving section, and is an amount of lens displacement in a case of driving a lens.

Figure 7:
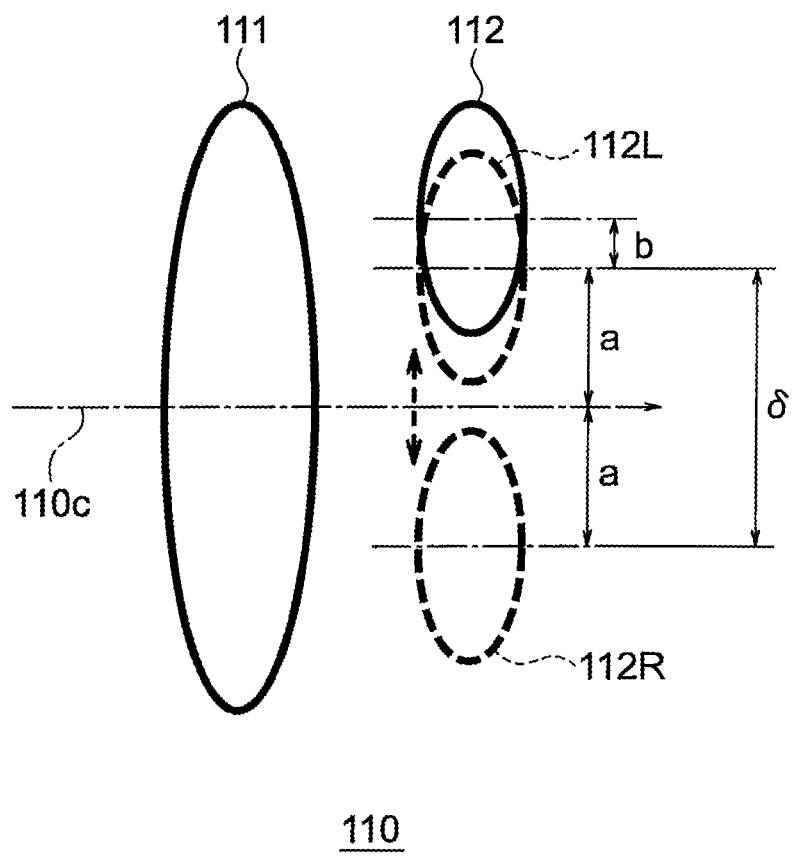
FIG. 7 is a cross-sectional view showing a configuration of the lenses in the first embodiment of the present invention, and is a diagram describing an amount of tilt-displacement and an amount of camera-shake correction.

The amount of tilt-displacement will be described below while referring to FIG. 7, citing the case of driving a lens. FIG. 7 is a cross-sectional view showing a configuration of the image pickup lens group 110, and is a diagram describing the amount of tilt-displacement and the amount of camera-shake correction. In FIG. 7, the amount of 3D displacement is shown to be substantial for the sake of convenience of description.

When the camera-shake is not to be taken into consideration, the amount of tilt-displacement of the movable lens 112, in the first tilt, corresponds to a position for left-eye image (L) 112L to which (the movable lens 112) is shifted only by the amount of 3D displacement from the optical axis 110C, and in the second tilt, corresponds to a position for right-eye image (R) 112R to which (the movable lens 112) is shifted in a direction opposite to the left-eye image from the optical axis 110c. The stereoscopic image pickup is carried out by recording images picked up which are acquired at the two positions 112L and 112R.

This calculation, for acquiring one-eye image with the optimum stereoscopic effect, includes a method of calculating in accordance with the capturing conditions by using a displacement-amount table corresponding to the capturing conditions.

Next, as the judgment of calculation-amount, the judging section 156 (stereoscopic image pickup judging section 157) compares (step S117) an absolute amount (absolute value) of the amount of camera-shake correction calculated by the first calculation and absolute amount (absolute value) of the amount of 3D displacement (the first tilt-displacement amount) calculated by the second calculation. Here, when the amount of camera-shake correction is more than the amount of 3D displacement (N at step S117), a judgment is made that it difficult to secure an image quality due to the effect of camera-shake even when the stereoscopic image pickup is carried out, and the warning process (step S118) is carried out.

When a result of the comparison at step S117 is that the amount of camera-shake correction is smaller than or same as the amount of displacement (Y at step S117), the drive-amount calculation controller 155 calculates the amount of displacement of the horizontal-vertical tilting unit 131 from the result of calculation of the amount of camera-shake correction (first calculation) and calculation of the amount of 3D displacement (second calculation) (step S119). In this calculation, the result of calculation of the amount of camera-shake correction and the result of calculation of the amount of 3D displacement are added.

Here, the calculation of the driving amount at step S119 will be described below by using FIG. 7, citing the case of driving a lens.

The drive-amount calculation controller 155 calculates a position attained upon adding a camera-shake correction amount b which is a result of the calculation of the amount of camera-shake correction (first calculation) and the 3D displacement amount a of the first-tilt which is a result of the calculation of the amount of 3D displacement (first-tilt, second calculation)

Furthermore, in the calculation of the drive amount, it is desirable to carry out further, the following calculation. In other words, the drive-amount calculation controller 155 calculates the amount of lens displacement such that 3D relative displacement amount δ and the camera-shake correction amount b satisfy the following expression (1). Moreover, the drive-amount calculation controller 155 calculates the predetermined threshold value at step S114 based on the result of calculation by the stereoscopic image pickup calculating section 154 as the second calculating section. Accordingly, by ignoring the camera-shake which has no effect on 3D, it is possible to increase the capturing chances.

$$0 < b/\delta < 1 \tag{1}$$

where, δ is a 3D relative displacement amount (tilt-displacement amount) of the movable lens 112 between the image pickup time of left image (L image pickup) and the image pickup time of right image (R image pickup) of the stereoscopic image pickup.

When the 3D relative displacement amount δ and the camera-shake correction amount b do not satisfy expression (1), the 3D relative displacement amount δ and the camera-shake correction amount b are to be restricted to satisfy expression (1). The restrictions are to be set by setting the mode of control for optimization according to the design of the optical system.

Here, in a case in which, b/δ is close to 0, an effect of the camera-shake correction tend to be difficult to achieve, and in a case in which, b/δ exceeds 1, the 3D effect is substantial but makes the user tiresome. Consequently, by carrying out calculation using expression (1), it is possible to reduce a difference between the 'first-tilt' image and the 'second-tilt' image forming the 3D image, which is due to the effect of camera shake, and to acquire a 3D image of a high level of quality.

Even in a case in which, a direction of the tilting-drive for the stereoscopic image pickup and a direction of the shifting for the camera-shake correction differ, both the calculation results namely, the result of the calculation of the amount of camera-shake correction (first calculation) and the result of the calculation of the amount of 3D displacement (second calculation, first-tilt) are basically to be used as they are. However, according to the optical design, since it might be difficult to secure optical performance when the drive-amount of the stereoscopic image pickup and the drive-amount of the camera-shake correction are combined, a table of combinations of the result of calculation of the amount of camera-shake correction (first calculation) and the result of the calculation of the amount of 3D displacement (second calculation) may be provided in advance, and restrictions may be set on the amount of camera-shake correction and the amount of 3D displacement according to the result of referring to the table of combinations.

Next, the drive-amount calculation controller 155, based on the result of calculation of the drive amount at step S119, makes the driving-signal output section 132a output a driving signal which drives the lens by an amount of displacement of the result of calculation of the drive amount, to the horizontal-vertical tilting unit 131, and drives the horizontal-vertical tilting unit 131 (step S120). Accordingly, a stereoscopic image of one-eye (first tilt) having no effect of the camera-shake is acquired.

Next, acquiring of the second image of the stereoscopic image pickup (second capturing) is started. Here, the second image is a one-eye image for the time-divided stereoscopic image pickup, such as a right-eye image.

When the AE, AF, AWB, and image pickup conditions differ for the first-tilt image and the second-tilt image, there is a strange perceptual feeling due to different size of the left eye and the right eye when the image is generated which will be described later. Therefore, for the AE, AF, and AWB, the process result at step S111 is to be used, and for the image pickup conditions, settings at step S101 are to be used.

Next, the camera-shake detector 160 carries out detection of camera shake by an instruction from the system controller 151 (step S121), similarly as at step S112. Furthermore, the camera-shake calculating section 153 calculates an amount of camera-shake correction based on the result of detection of camera-shake by the camera-shake detector 160 (step S122) as a camera-shake correction amount calculation (first calculation), similarly as at step S113. Moreover, the judging section of the system controller makes a judgment of whether or not the amount of camera-shake correction or the amount of camera-shake calculated at step S122 is smaller than or same as a predetermined threshold value (step S123).

When at step S123, the amount of camera-shake correction or the amount of camera-shake exceeds the threshold value (N at step S123), the warning process (FIG. 8) which will be described later is carried out (step S124).

Whereas, when at step S123, the amount of camera-shake correction or the amount of camera-shake is smaller than or same as the threshold value (Y at step S123), the stereoscopic image pickup calculating section 154 calculates the amount of 3D displacement as a second tilt (step S125, second calculation), similarly as at step S116. The stereoscopic image pickup calculating section 154 (tilt calculating section), for acquiring a one-eye image for the time-divided stereoscopic image pickup such as a second-tilt image for right eye, calculates the amount of displacement of the horizontal-vertical tilting unit 131.

Next, as the judgment of calculation-amount, the judging section 156 (stereoscopic image pickup judging section 157) compares (step S126) an absolute amount of the amount of camera-shake correction calculated by the first calculation and the amount of 3D displacement (the second-tilt displacement amount) calculated by the second calculation. Here, when the amount of camera-shake correction is more than the amount of 3D displacement (N at step S126), a judgment is made that it is difficult to secure an image quality due to the effect of camera-shake even when the stereoscopic image pickup is carried out, and the warning process (step S127) is carried out.

When a result of the comparison at step S126 is that the amount of camera-shake correction is smaller than or same as the amount of displacement (Y at step S126), the drive-amount calculation controller 155 calculates the amount of displacement of the horizontal-vertical tilting unit 131 from the result of calculation of the amount of camera-shake correction (first calculation) and the calculation of the amount of 3D (second tilt) displacement (step S128), similarly as at step S119.

Next, similarly as at step S120, the drive-amount calculation controller 155, based on the result of calculation of the drive amount at step S128, makes the driving-signal output section 132 output a driving signal which drives the lens by an amount of displacement of the result of calculation of the drive-amount, to the horizontal-vertical tilting unit 131, and drives the horizontal-vertical tilting unit 131 (step S129). Accordingly, a stereoscopic image of one eye (second tilt) having no effect of the camera-shake is acquired.

The image processor 141 generates a stereoscopic image (step S130) from the one-eye image (first-tilt image) acquired at steps from S111 to S120, and the one-eye image (second-tilt image) acquired at steps from S121 to S129. The stereoscopic image which is generated is recorded according to a recording format including compressed format in the recording section 144. Moreover, the stereoscopic image which is recorded is reproduced in the output processor 143.

The generation of the stereoscopic image may be by any of various formats (such as a multi-picture format and a side-by-side).

The abovementioned image pickup mode is terminated by an operation of the instruction section 152 by the user (step S131)

Figure 8:
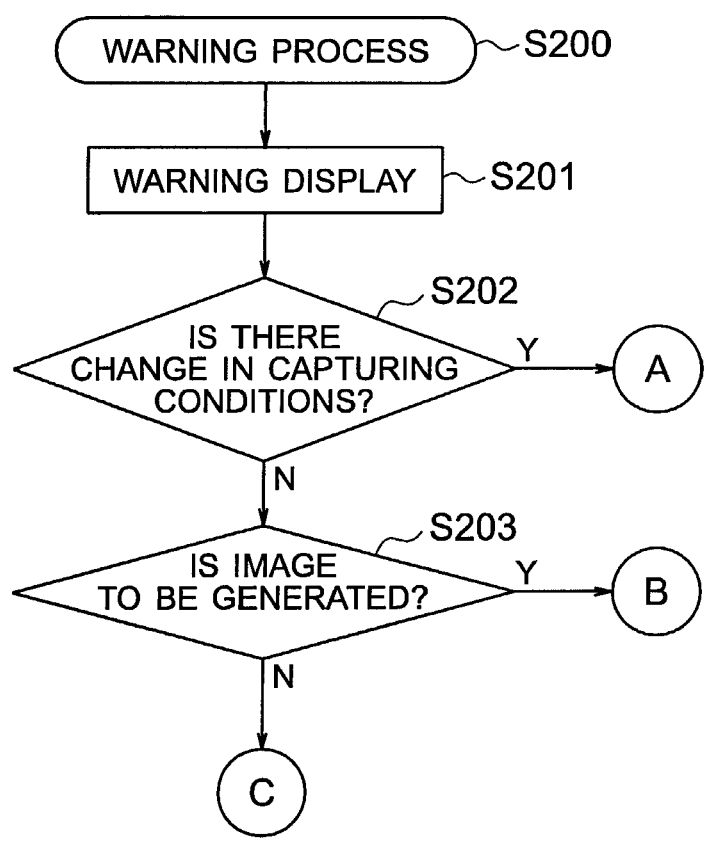
FIG. 8 is a flowchart describing a flow of a warning process.

Here, a flow of a warning process when the amount of camera-shake or the amount of camera-shake correction has been judged to be large in various judgments mentioned above (step S115, step S118, step S124, and step S127 in FIG. 4) will be described below while referring to FIG. 8. FIG. 8 is a flowchart describing the flow of the warning process.

The warning process starts (step S200) when in the judgments at the abovementioned steps S114, S117, S123, and S126, the judging section 156 makes a judgment that the image pickup is carried out with the large amount of camera-shake by the user. Firstly, as a warning display (step S201), warning information from the image processor 141 is superimposed, and displayed on the display device from the output processor 143, thereby making the user aware of degradation of image quality due to camera-shake. The warning display is made by displaying an icon notifying the camera-shake or display by characters 'CAUTION CAMERA-SHAKE'. The display device corresponds to a liquid-crystal display monitor 547 in the digital camera 540 shown in FIG. 14.

Next, the judging section 156 superimposes information asking if there is a change in image pickup conditions by the image processor 141, and displays on the display device from the output processor 143, thereby notifying the user if any change is to be made in the image pickup conditions (step S202). The information asking if there is a change in the image pickup conditions is displayed by displaying characters 'SHUTTER-RELEASE BUTTON TO BE RELEASED IN A CASE OF CHANGING IMAGE PICKUP CONDITIONS'.

At step S202, when the change in image pickup conditions is selected by releasing the shutter-release button by the user (Y at step S202), the process returns to immediately-prior setting of image pickup conditions (step S101 in FIG. 4).

Whereas, when the shutter-release button is not released by the user, and the change in image pickup conditions is not selected (N at step S202), the stereoscopic image pickup judging section 157 makes a judgment of whether or not an image is to be generated (step S203). Concretely, the stereoscopic image pickup judging section 157 superimposes the information asking if there is an image generation by the image processor 141, and displays on the display device from the output processor 143, thereby asking the user if an image-pickup image is to be generated. The information asking if there is an image pickup generation is displayed by characters 'RELEASE SHUTTER-RELEASE BUTTON WHEN CAPTURED IMAGE IS NOT REQUIRED'.

At step S203, when the shutter-release button is not released by the user, and an image is to be generated (Y at step S203), the process returns to a step which is immediately after shifting to the warning process flow.

Whereas, when the shutter-release button is released by the user and an image is not to be generated, the process shifts (C) next to the image generation step (step S130 in FIG. 4).

In the warning process, according to need and usability, judgment steps S202 and S203 may not be used.

Figure 9:
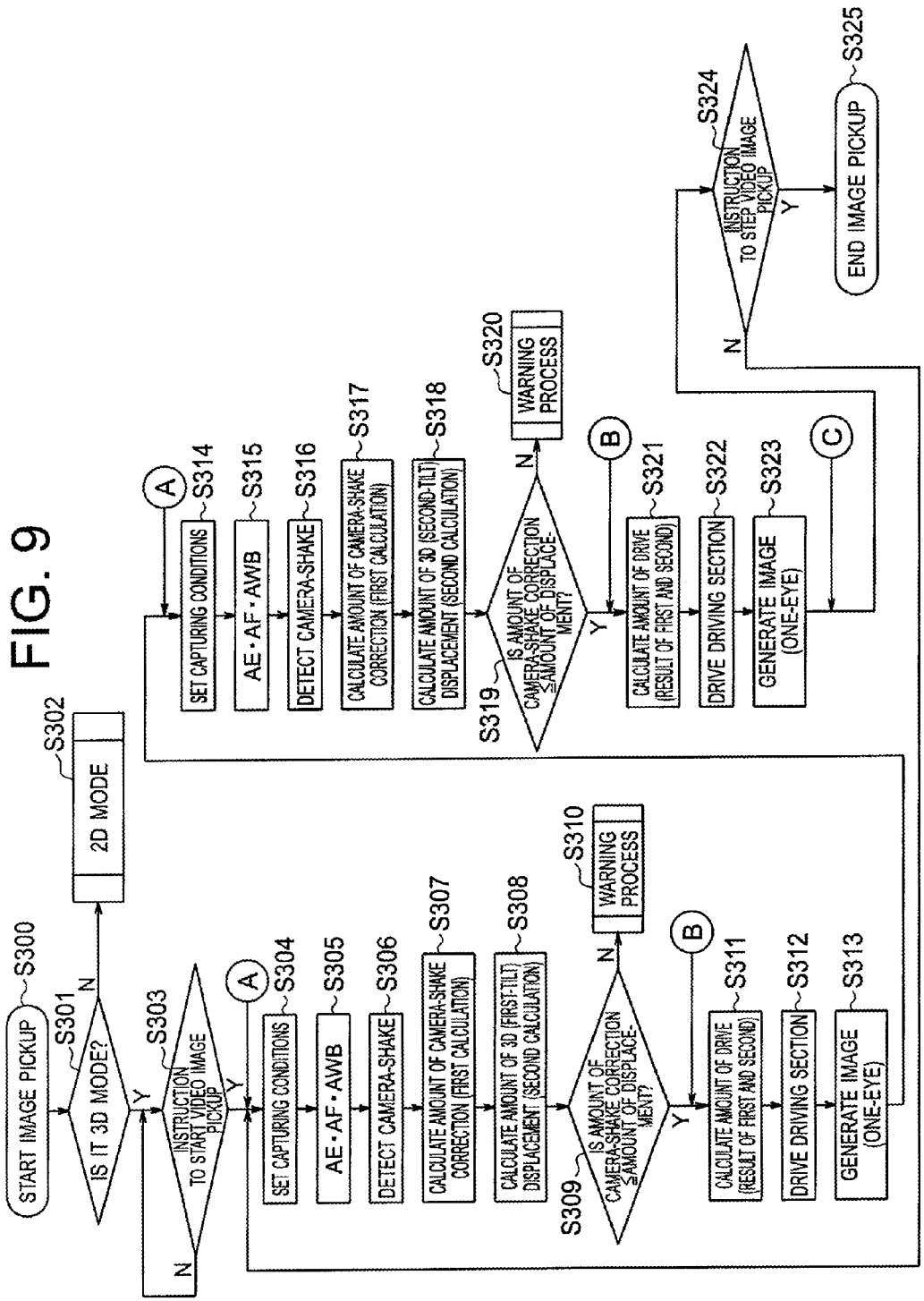
FIG. 9 is a flowchart showing a flow of an image pickup process of a video image using the image pickup apparatus according to the first embodiment.

Next, a flow of image pickup in a case of video will be described below while referring to FIG. 9. FIG. 9 is a flowchart showing the flow of an image pickup process of a video image using the image pickup apparatus according to the first embodiment.

A warning process (step S310 and step S320) in FIG. 9 is carried out by the flow shown in FIG. 8 similarly as the warning process shown in FIG. 4. Moreover, a description in detail of a process which is similar to the process shown in FIG. 4 will be omitted.

The image pickup is started by the instruction section 152 being used by the user (step S300). It is assumed that the camera is already started and a live view is ON.

Here, in a case of a time-divided stereoscopic image pickup of a video image, by changing capturing conditions for image pickup twice for left and right for a stereoscopic image, it is possible to carry out a natural image pickup for a change in photographing environment.

Next, the user selects a 2D or a 3D photography mode (step S301). When the mode selected by the user at step S301 is 2D (2-dimensional) (N at step S301), the system controller 151, without carrying out stereoscopic image pickup, picks up an image as by the existing 2D camera (step S302).

Whereas, when 3D mode is selected (Y at step S301), the process moves to a state in which, the stereoscopic image pickup is possible, and the system controller 151 maintains a stand-by state (N at step S303) till there is an instruction to start video image pickup by the instruction section 152 being operated by the user. When the instruction to start video pickup is given by an operation by the user, the following video image pickup starts (Y at step S303).

Firstly, a process for acquiring a first image such as a right-eye image as one-eye image for a time-divided stereoscopic image is to be carried out. A description in detail, being similar as for the existing camera, will be omitted. To start with, the user sets image pickup conditions according to the photographing environment (step S304). Here, the image pickup conditions are to be updated continuously according to the photographing environment.

Next, the AE, AF, and AWB processes are carried out (step S305). These processes are similar to the processes at step S104 in FIG. 4.

Next, the camera-shake detector 160 carries out detection of camera-shake according to an instruction from the system controller 151 (step S306) similarly as at step S107. Furthermore, the camera-shake calculating section 153 calculates the amount of camera-shake correction as the camera-shake correction amount calculation (first calculation) based on the result of detection of camera-shake by the camera-shake detector 160 (step S307) similarly as at step S108.

The stereoscopic image pickup calculating section 154 calculates the amount of 3D displacement as a first-tilt (second calculation, step S308) similarly as at step S116. The stereoscopic image pickup calculating section 154, for acquiring a one-eye image for the time-divided stereoscopic image pickup such as a first-tilt image for left eye, calculates the amount of displacement of the horizontal-vertical tilting unit 131.

Next, as the judgment of calculation amount, the judging section 156 (stereoscopic image pickup judging section 157) compares an absolute amount of the amount of camera-shake correction calculated by the first calculation and an absolute amount of the amount of 3D displacement calculated by the second calculation (step S309). Here, when the amount of camera-shake correction is more than the amount of 3D displacement (N at step S309), a judgment is made that it is difficult to secure an image quality due to the effect of camera-shake even when the stereoscopic image pickup is carried out, and the warning process (step S310) is carried out.

When a result of the comparison at step S309 is that the amount of camera-shake correction is smaller than or same as the amount of displacement (Y at step S309), the drive-amount calculation controller 155 calculates the amount of displacement of the horizontal-vertical tilting unit 131 from the result of calculation of the amount of camera-shake correction (first calculation) and calculation of the amount of 3D (first-tilt) displacement (second calculation) (step S311), similarly as at step S119.

The drive-amount calculation controller 155, similarly as at step S120, based on the result of calculation of the drive amount, makes the driving-signal output section 132a output driving signal which drives the lens by an amount of displacement of the result of calculation of the drive amount, to the horizontal-vertical tilting unit 131, and drives the horizontal-vertical tilting unit 131 (step S312).

Next, the image processor 141 generates an image by imparting an identification code for the right eye, for the one-eye image (first-tilt image) which has been acquired at steps from S304 to S312 (step S313). The stereoscopic image which is generated is recorded according to the recording format including compressed format in the recording section 144.

Next, a process for acquiring a left-eye image as one-eye image for a time-divided stereoscopic image is to be carried out. A procedure for the process being similar to the process of acquiring first image described above, the procedure will be described below in brief.

Firstly, the user sets image pickup conditions according to the photographing environment (step S314), and carries out AE, AF, and AWB processes (step S315).

Next, the camera-shake detector 160 carries out detection of camera-shake according to an instruction from the system controller 151 (step S316). Furthermore, the camera-shake calculating section 153 calculates the amount of camera-shake correction as the camera-shake correction calculation (first calculation) based on the result of detection of camera-shake by the camera-shake detector 160 (step S317).

Furthermore, the stereoscopic image pickup calculating section 154 calculates the amount of 3D displacement as the first-tilt (second calculation, step S318), and calculates the amount of displacement of the horizontal-vertical tilting unit 131 for acquiring a one-eye image for time-divided stereoscopic image pickup such as the first tilt image for left eye.

Next, as the judgment of calculation amount, the judging section 156 (stereoscopic image pickup judging section 157) compares an absolute amount of the amount of camera-shake correction calculated by the first calculation and an absolute amount of the amount of 3D displacement calculated by the second calculation (step S319). Here, when the amount of camera-shake correction is more than the amount of 3D displacement (N at step S319), a judgment is made that it is difficult to secure an image quality due to the effect of camera-shake even when the stereoscopic image pickup is carried out, and the warning process (step S320) is carried out.

When a result of the comparison at step S319 is that the amount of camera-shake correction is smaller than or same as the amount of displacement (Y at step S319), the drive-amount calculation controller 155 calculates the amount of displacement of the horizontal-vertical tilting unit 131 from the result of calculation of the amount of camera-shake correction (first calculation) and calculation of the amount of 3D displacement (second calculation) step S321).

The drive-amount calculation controller 155, based on the result of calculation of the drive amount at step S321, makes the driving-signal output section 132a output a driving signal which drives the lens by an amount of displacement of the result of calculation of the drive amount, to the horizontal-vertical tilting unit 131, and drives the horizontal-vertical tilting unit 131 (step S322).

Next, the image processor 141 generates an image by imparting an identification code for the left eye, for the one-eye image (second-tilt image) which has been acquired at steps from S314 to S322 (step S323). The stereoscopic image which has been generated is recorded according to the recording format including compressed format in the recording section 144.

Furthermore, the image processor 141 generates a stereoscopic image from the one-eye image (first-tilt image) acquired at steps from S304 to S313, and the one-eye image (second-tilt image) acquired at steps from S314 to S323. The stereoscopic image which has been generated is recorded according to the recording format including compressed format in the recording section 144. Moreover, the stereoscopic image which has been recorded is reproduced in the output processor 143.

The generation of the stereoscopic image may be by any of various formats (such as the multi-picture format and the side-by-side).

The system controller 151 carries out the abovementioned operation repeatedly till an instruction is given by the user to stop the video image pickup by operating a video photography button such as the shutter-release button (N at step S324).

As the instruction is given by the user to stop the video image pickup by operating the video photography button (Y at step S324), the system controller 151 terminates the image pickup (step S325).

Second Embodiment

An image pickup apparatus according to a second embodiment differs from the image pickup apparatus according to the first embodiment at a point that an image pickup element 120 and not the image pickup lens group 110 is driven for acquiring the first image and the second image of the stereoscopic image, and for camera-shake correction. In the following description, same reference numerals are used for components which are same as in the image pickup apparatus of the first embodiment, and description in detail thereof will be omitted.

Figure 10:
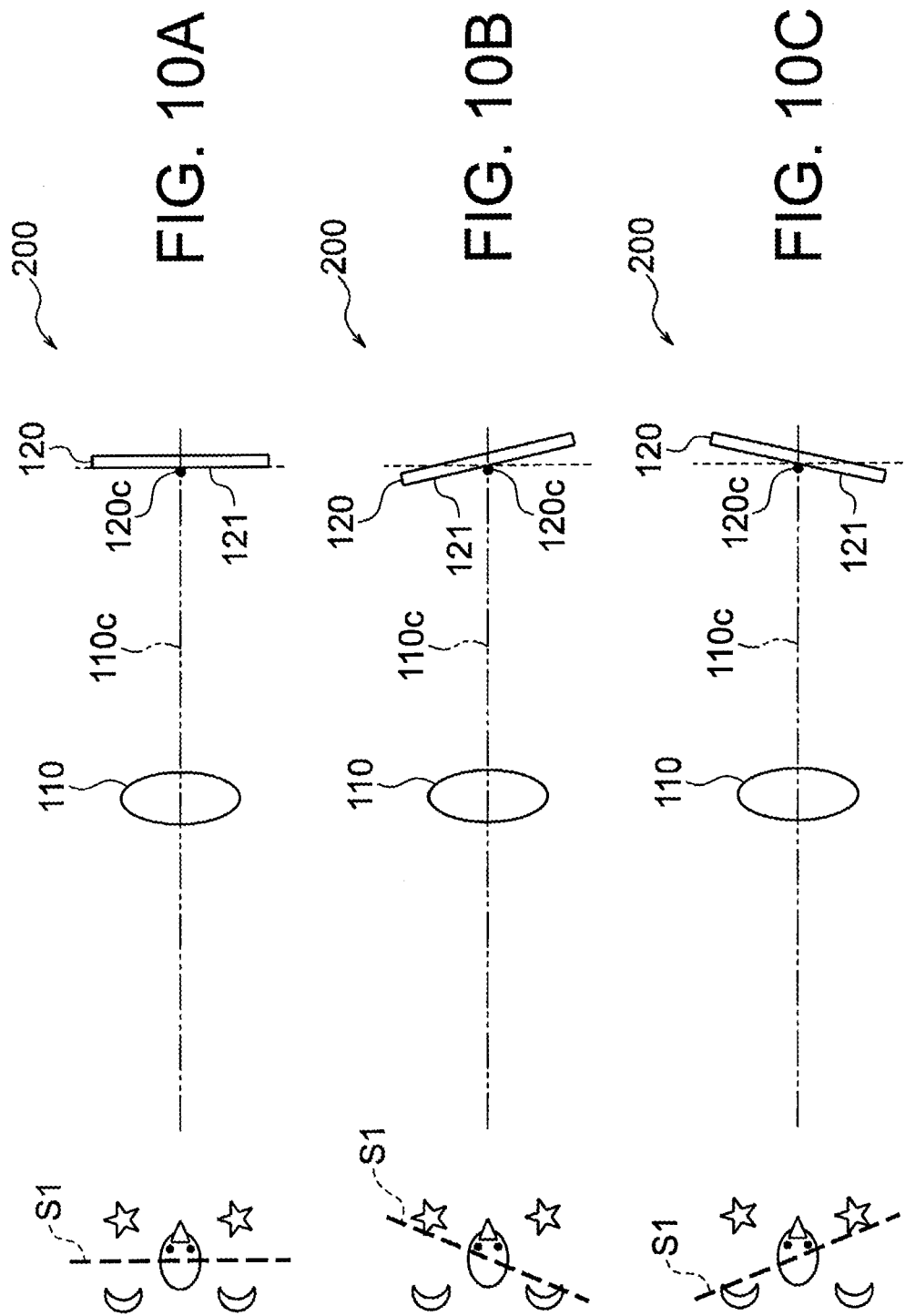
FIG. 10A, FIG. 10B, and FIG. 10C are top views showing a concept of an image pickup apparatus according to a second embodiment of the present invention.
Figure 11:
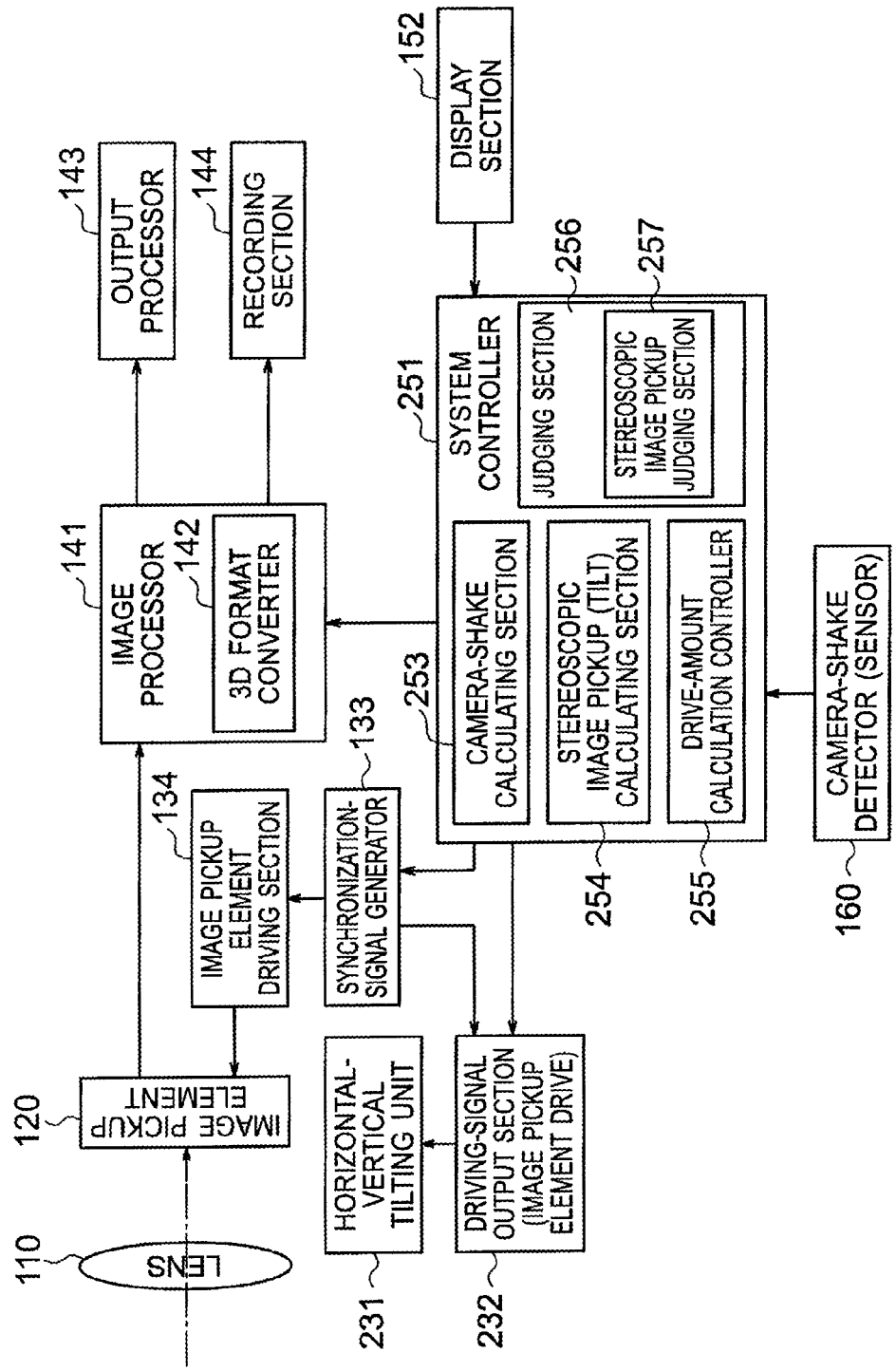
FIG. 11 is a block diagram showing a configuration of the image pickup apparatus according to the second embodiment.

FIG. 10A, FIG. 10B, and FIG. 10C are top views showing a concept of a digital camera 200 as the image pickup apparatus according to the second embodiment. FIG. 11 is a block diagram showing a configuration of the digital camera 200 according to the second embodiment.

A driving-signal output section 232, under the control of a system controller 251, carries out tilt-control of an image pickup surface of the image pickup element 120 with a vertical synchronization signal VD generated by the synchronization-signal generator 133 as a basis for timing. The system controller 251, confirming to the 3D mode which has been determined based on the input from the instruction section 152, selects a direction of tilting, an amount of tilting, and a photography pattern of the image pickup surface, and carries out the control of tilting of the image pickup surface.

A horizontal-vertical tilting unit 231 shifts the image surface of the image pickup element 120 according to a control instruction of the driving-signal output section 232. The tilting can be carried out by using a voice coil motor (VCM), a stepping motor, and an ultrasonic motor.

A camera-shake calculating section 253 calculates the amount of camera-shake correction based on the result of detection by the camera-shake detector 160. A stereoscopic image pickup calculating section 254 (tilt image pickup calculating section), as a second calculating section, calculates an amount of 3D displacement of the first tilt and an amount of 3D displacement of the second tilt. A drive-amount calculation controller 255 controls the tilting of the image pickup surface of the image pickup element 120 based on the result of calculation of the amount of camera-shake correction by the camera-shake calculating section 253. A judging section 256 (stereoscopic image pickup judging section) compares an absolute amount of the amount of camera-shake correction calculated by the first calculation and an absolute amount of the amount of 3D displacement (first-tilt displacement amount and second-tilt displacement amount) calculated by the second calculation. A stereoscopic image pickup judging section 257, upon superimposing information of checking whether there is image generation by the image processor 141, displays to the display device from the output processor, and confirms if there is generation of the image which it has picked up, to the user.

As shown in FIG. 10A, FIG. 10B, and FIG. 10C, a tilt axis 120*c* (a pivot axis) is provided on an extension line of the optical axis 110*c* of the image pickup lens group 110. The horizontal-vertical tilting unit 231 is capable of tilting the image pickup element 120 to both left and right directions (upper and lower side in FIG. 10A, FIG. 10B, and FIG. 10C) with the tilt axis as the central axis. Consequently, an angle of an image pickup surface 121 of the image pickup element 120 with respect to the optical axis 10*c* changes by an operation of the horizontal-vertical tilting section 231. In other words, by driving the horizontal vertical tilting section 231, the image pickup surface 121 can be tilted from a normal state of being at right angles with respect to the optical axis 110*c* as in FIG. 10A, to a state in which, a right-end side (an upper side in FIG. 10A, FIG. 10B, and FIG. 10C) of the image pickup surface 121 is brought closer to the image pickup lens group 110 and a left-end side (a lower side in FIG. 10A, FIG. 10B, and FIG. 10C) is moved away from the image pickup lens group 110 (FIG. 10B), and to a state in which, a left side of the image pickup surface 121 is brought closer to the image pickup lens group 110 and a right side of the image pickup surface 121 is moved away from the image pickup lens group 110 (FIG. 10C).

Furthermore, an object plane S1 is perpendicular to the optical axis 110*c* in the normal state in FIG. 10A, whereas, when the image pickup element 120 is pivoted as shown in FIG. 10B, the object plane S1 is inclined such that a right-end side (an upper side in FIG. 10A, FIG. 10B, and FIG. 10C) comes closer to the image pickup lens group 110 and a left-end side (a lower side in FIG. 10A, FIG. 10B, and FIG. 10C) moves away from the image pickup lens group 110. Moreover, when the image pickup element 120 is pivoted as shown in FIG. 10C, the object plane is inclined such that the left-end side comes closer to the image pickup lens group 110 and the right-end side moves away from the image pickup lens group 110. Such an inclination of the object plane is based on Scheimpflug principle mentioned above.

In the digital camera 200, it is possible to acquire a stereoscopic image by a pair of images with no parallax namely, an image which has been acquired by driving the image pickup element 120 in the state in FIG. 10B (first image, left-eye image) and an image which has been acquired by driving the image pickup element 120 in the state in FIG. 10C (second image, right-eye image). More concretely, the digital camera 200, as shown in FIG. 10B, acquires an image which is captured upon tilting the image pickup surface 121 of the image pickup element 120 from front-left to rear-right such that the object plane S1 is tilted from rear-left to front-right, as the right-eye image, and as shown in FIG. 10C, acquires an image which is captured upon tilting the image pickup surface 121 of the image pickup element 120 from front-right to rear-left such that the object plane S1 is tilted from front-left to rear-right, as the left-eye image, and acquires the stereoscopic image from the pair of the right-eye image and the left-eye image.

The image pickup, in a case of a still image, is carried out similarly as the procedure shown in FIG. 4, and in a case of a video image, is carried out similarly as the procedure shown in FIG. 9.

However, the drive-amount calculation controller 155 controls the tilting of the image pickup surface of the image pickup element 120 based on the result of calculation of the amount of camera-shake correction by the camera-shake calculating section 253, and carries out the tilting of the image surface of the image pickup element 120 by applying a driving signal corresponding to the amount of camera-shake correction of the result of the shaking calculation, from the driving-signal output section 232 to the horizontal-vertical tilting unit 231. Accordingly, the camera-shake correction is carried out by tilting the image pickup surface of the image pickup element 120 based on the amount of camera-shake correction which has been calculated, and an image without an effect of camera-shake is acquired.

Moreover, the threshold value in the judgment of whether or not the amount of camera-shake correction or the amount of camera-shake is smaller than or same as a predetermined threshold value, which is made by the judging section 156 of the system controller 151 is an arbitrary value from 0 to a displacement limit of the image pickup surface of the image pickup element 120, or, a value determined by a threshold-value table in which, an effect of shaking is taken into consideration according to the capturing conditions.

Moreover, the amount of 3D displacement which is calculated by the stereoscopic image pickup calculating section 254 was the amount of lens-displacement in the first embodiment, is an amount of tilt-displacement of the image pickup surface of the image pickup element 120 in the second embodiment.

The rest of the structure, action, and effect are similar as in the first embodiment.

Third Embodiment

An image pickup apparatus according to a third embodiment of the present invention differs from the image pickup apparatus according to the first embodiment at a point that in the image pickup apparatus according to the third embodiment, the image pickup surface of the image pickup element 120 is driven for acquiring the first image and the second image of the stereoscopic image, and the movable lens 112 of the image pickup lens group 110 is driven for the camera-shake correction. In the following description, same reference numerals are used for components which are same as in the image pickup apparatus of the first embodiment, and a description in detail of such components is omitted.

Figure 12:
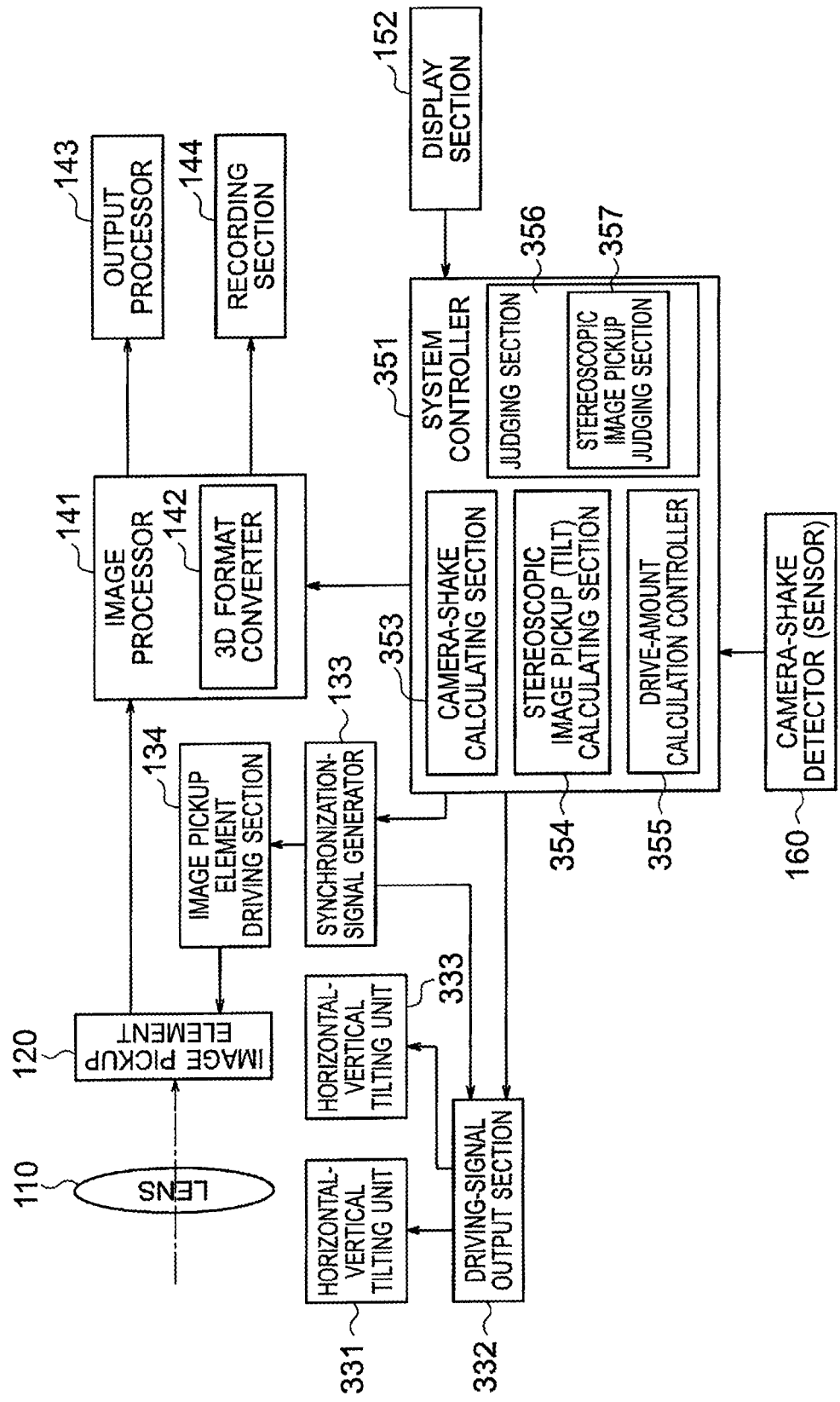
FIG. 12 is a block diagram showing a configuration of an image pickup apparatus according to a third embodiment of the present invention.

FIG. 12 is a block diagram showing a configuration of an image pickup apparatus according to the third embodiment.

A driving-signal output section 332, under the control of a system controller 351, carries out a control of shifting of the movable lens 112 of the image pickup lens group 110, and a control of tilting of the image pickup surface of the image pickup element 120, with the vertical synchronization signal VD which has been generated by the synchronization-signal generator 133, as a basis for timing. The system controller 351, conforming to the 3D mode which is determined based on the input from the instruction section 152, selects the direction of shifting and the amount of shifting of the movable lens 112, and the direction of tilting and the amount of tilting of the image pickup surface, and the photography pattern, and carries out the control of shifting of the movable lens 112 and the control of tilting of the image pickup surface.

A horizontal-vertical tilting unit 331 shifts the movable lens 112 of the image pickup lens group 110 according to a control instruction of the driving-signal output section 332. A horizontal-vertical tilting unit 333 tilts the image pickup surface of the image pickup element 120 according to a control instruction of the driving-signal output section 332. The shifting and the tilting of the movable lens 112 can be carried out by using a voice coil motor (VCM), a stepping motor, and an ultrasonic motor.

A camera-shake calculating section 353, as a first calculating section, calculates the amount of camera-shake correction based on the result of detection by the camera-shake detector 160. A stereoscopic image pickup calculating section 354 (tilt image pickup calculating section), as a second calculating section, calculates an amount of 3D displacement of the first tilt and an amount of 3D displacement of the second tilt. A drive-amount calculation controller 355 controls the shifting of the movable lens 112 of the image pickup lens group 110 based on the result of calculation of the amount of camera-shake correction by the camera-shake calculating section 353. A judging section 356 (stereoscopic image pickup judging section) compares an absolute amount of the amount of camera-shake correction calculated by the first calculation and an absolute amount of the amount of 3D displacement (first tilt-displacement amount and second tilt-displacement amount) calculated by the second calculation. A stereoscopic image pickup judging section 357, upon superimposing information of checking whether there is image generation by the image processor 141, displays to the display device from the output processor, and confirms if there is generation of the image it has picked up, to the user.

The image pickup in the case of a still image is carried out similarly as the procedure shown in FIG. 4, and in the case of a video image is carried out similarly as the procedure shown in FIG. 9.

Moreover, the amount of 3D displacement calculated by the stereoscopic image pickup calculating section 354 was the amount of lens displacement in the first embodiment but is an amount of tilt-displacement of the image pickup surface of the image pickup element 120 in the second embodiment.

In the image pickup apparatus of the third embodiment, the drive amount of the movable lens 112 is calculated in calculation of the amount of camera-shake correction (first calculation) and the amount of tilting of the image pickup surface of the image pickup element 120 is calculated in calculation of the amount of 3D displacement (second calculation), and based on the result of each calculation, the respective devices are driven. In such manner, by using exclusive elements for acquiring the stereoscopic image and for camera-shake correction, it is possible to operate the optical system optimally.

Depending on the design of an image pickup optical system, ideal characteristics in a state of the image pickup element 120 tilted may not be achieved. In such case, from a result of optical design, a table of an amount of tilting of the image pickup element and an amount of camera-shake correction of the image pickup lens group 110 may be set in advance, and an arrangement may be made to drive by an amount of driving of each element which has been set in the table, according to the amount of tilting of the image pickup element 120 and the amount of camera-shake correction of the image pickup lens group 110.

Moreover, when preparing the table, weight of each parameter may be changed such that the amount of camera-shake correction is ideal and the amount of tilting of the image pickup element for 3D image pickup is reduced to be small. In such table, the stereoscopic effect cannot be achieved ideally but the effect due to shaking can be suppressed ideally. Therefore, it is possible to achieve an image of high quality level without camera-shake.

The rest of the structure, action, and effect are similar as in the first embodiment.

In the first embodiment, the second embodiment, and the third embodiment described above, the 3D image pickup mode has been explained with an element tilting mode. However, in a case in which driving of element for carrying out time-divided image pickup and driving of camera-shake correction are to be carried out simultaneously, any structure and mode may be used. For instance, drive for camera-shake correction may be carried out for both the lens and the image pickup element, and drive for acquiring 3D image pickup may be carried out for one of the lens and the image pickup element, without the combinations being restricted.

Figure 13:
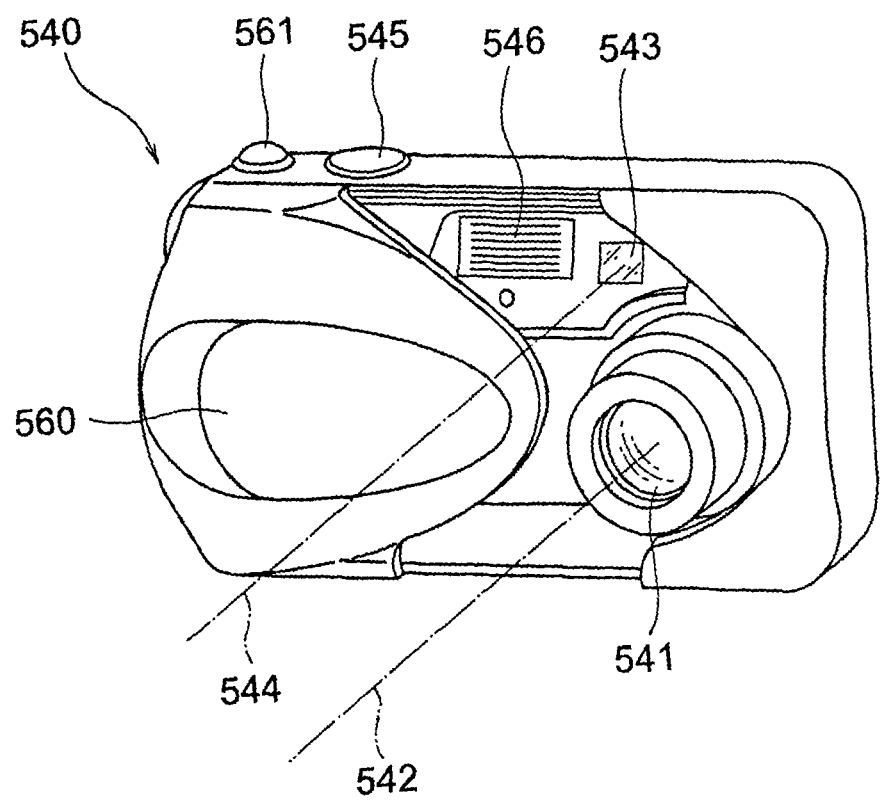
FIG. 13 is a front perspective view showing an appearance of a digital camera.
Figure 14:
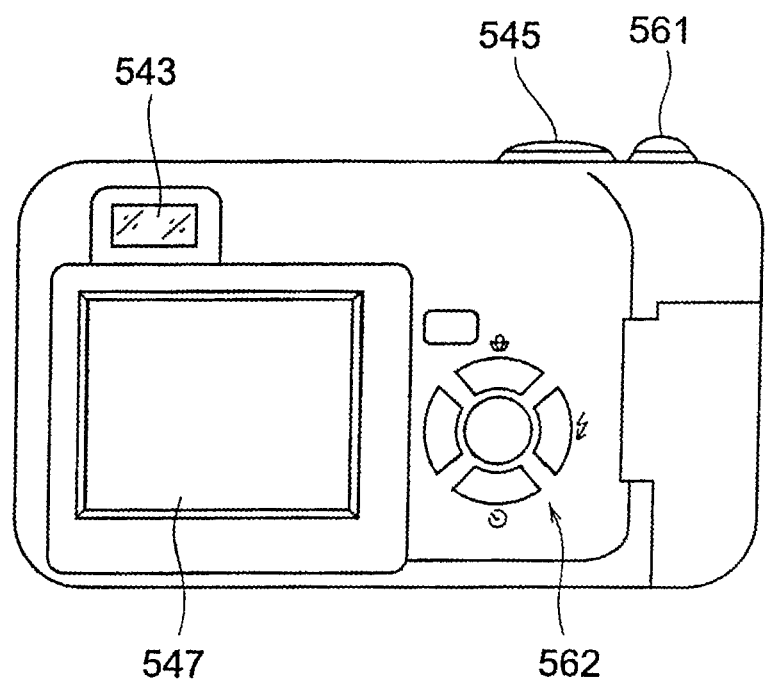
FIG. 14 is a rear perspective view showing an appearance of the digital camera.

FIG. 13 and FIG. 14 are diagrams showing a concrete example of a digital camera having a structure and an effect as described above. FIG. 13 is a front perspective view showing an appearance of a digital camera 40 and FIG. 14 is a rear perspective view showing an appearance of the digital camera 540. FIG. 13 shows a state in which a lens barrel of a photographic optical system 541 is not collapsed.

The digital camera 540, in this example, includes the photographic optical system 541 having an optical path for capturing (hereinafter, 'capturing optical path') 542, a finder optical system 543 having an optical path for finder ('finder optical path'), a shutter button 545, a flash 546, a liquid-crystal display monitor 547, a focal-length changing button 561, and a setting-changing switch 562. When the lens barrel of the photographic optical system 541 is collapsed, by sliding a cover 560, the photographic optical system 541, the finder optical system 543, and the flash 546 are covered by the sliding cover 560. Moreover, when the digital camera 540 is set to be in a capturing state upon opening the cover 560, the photographic optical system 541 assumes a state in FIG. 13 in which the lens barrel is not collapsed, and when the shutter button 545 (shutter-release button) disposed on an upper portion of the digital camera 540 is pressed, in conjunction with the pressing of the shutter button 545 capturing starts through the photographic optical system 541 such as the lens group 110 shown in FIG. 5. An object image which is formed by the photographic optical system 541 is formed on the image pickup surface of the image pickup element 120 in the first embodiment shown in FIG. 5. The object image which is received optically on the image pickup element 120, upon passing through 141 and 143, is displayed as an electronic image on the liquid-crystal display monitor 547 which is provided on a rear surface of the digital camera 540.

As it has been described above, the image pickup apparatus and the interchangeable lens according to the present invention are useful for acquiring a stereoscopic (3D) image in the digital camera.

The image pickup apparatus according to the present invention shows an effect that it is possible to acquire a left image and a right image in which the camera-shake has been taken into consideration, and accordingly it is possible to acquire a high-quality 3D image pickup image. Moreover, it is possible to realize optimally the camera-shake correction and the 3D image pickup by one image pickup element, and accordingly, it is possible to reduce a cost of the image pickup apparatus.

What is claimed is:

1. An image pickup apparatus comprising:
one of an image pickup lens and a mounting portion on which an interchangeable image pickup lens is mounted;
a synchronization-signal generator to which a trigger signal is input, and which outputs a first synchronization signal and a second synchronization signal based on one trigger signal;
an image pickup element which carries out a first capturing based on the first synchronization signal and carries out a second capturing based on the second synchronization signal;
a first calculating section which calculates an amount of camera-shake correction based on an amount of shaking of the image pickup apparatus which has been detected, when each of the first capturing and the second capturing is carried out;
a second calculating section which calculates at least an amount of optical tilt-displacement between the image pickup element and an object for the first capturing, which is necessary for the second capturing,
wherein the second calculating section, based on a calculation result of the first calculating section and a calculation result of the second calculating section, calculates one of an amount of shift by which some of the image pickup lenses and the interchangeable image pickup lenses are to be shifted in a direction perpendicular to an optical axial direction of the interchangeable image pickup lenses or the image pickup lenses, and an amount of change by which an angle of an image pickup surface of the image pickup element with respect to the optical axial direction is to be changed, while the first capturing and the second capturing are being carried out, and
the image pickup apparatus further comprising:
a driving-signal output section which outputs a driving signal which drives some of the interchangeable image pickup lenses or the image pickup lenses, or the image pickup element, based on a result of calculation by the second calculating section.

2. The image pickup apparatus according to claim 1, further comprising:
a stereoscopic-image pickup judging section which makes a judgment of whether or not to carry out the second capturing, based on whether or not the calculation result by the first calculating section has crossed a threshold value,
wherein when it has been determined by the stereoscopic-image pickup judging section that the second capturing is not to be carried out, the driving-signal output section does not out put the driving signal.

3. The image pickup apparatus according to claim 2, further comprising:
a threshold value calculating section which calculates the predetermined threshold value based on the calculation result of the second calculating section,
wherein the amount of optical tilt-displacement and the amount of camera-shake correction satisfy the following expression (1)

$$0 < b/\delta < 1 \tag{1}$$

where,
b denotes the amount of camera-shake correction, and
$\delta$ denotes the amount of optical tilt-displacement.

4. The image pickup apparatus according to claim 3, wherein the first calculating section, based on the amount of tilt-displacement calculated by the second calculating section, changes the amount of camera-shake correction such that the expression (1) is satisfied.

5. The image pickup apparatus according to claim 3, wherein the threshold value calculating section calculates the calculation result of the second calculating section as the predetermined threshold value.

6. The image pickup apparatus according to claim 2, further comprising:
a warning section which gives a warning to a user when it has been determined by the stereoscopic-image pickup judging section that the second capturing is not to be carried out.

7. The image pickup apparatus according to claim 2, further comprising:
an instruction section on which image pickup conditions are to be set; and
a system controller which changes the image pickup conditions when it has been determined by the stereoscopic-image pickup judging section that the second capturing is not to be carried out.

8. The image pickup apparatus according to claim 2, wherein the image pickup element carries out the second capturing even when the driving signal has not been output by the driving-signal output section.

9. The image pickup apparatus according to claim 1, wherein the image pickup element can be driven in a shifting direction in which the image pickup element is shifted along a planar direction which is perpendicular to the optical axis, and a tilting direction in which an angle of an image pickup surface of the image pickup element is changed with respect to the optical axis, and
wherein the driving-signal output section outputs the driving signal to drive the image pickup element in the tilting direction after being driven in the shifting direction.

10. The image pickup apparatus according to claim 1, wherein when the calculation result by the first calculating section crosses the predetermined threshold value, the second calculating section does not calculate the amount of tilt-displacement.

* * * * *